United States Patent [19]

Bonnet

[11] 4,312,822

[45] Jan. 26, 1982

[54] CONTINUOUS PRODUCTION OF BUILDING ELEMENTS HAVING CELLULAR CORES

[75] Inventor: Alain Bonnet, Clermont, France

[73] Assignee: Saint Gobain Industries, Neuilly, France

[21] Appl. No.: 128,087

[22] Filed: Mar. 7, 1980

Related U.S. Application Data

[63] Continuation of Ser. No. 12,716, Feb. 16, 1979, abandoned, which is a continuation of Ser. No. 575,387, May 9, 1975, abandoned, which is a continuation of Ser. No. 278,819, Aug. 8, 1972, abandoned.

[30] Foreign Application Priority Data

Aug. 10, 1971 [FR] France ............................... 71 29174

[51] Int. Cl.[3] ......................... B29D 27/04; B29D 3/00

[52] U.S. Cl. ..................................... 264/70; 264/45.8; 264/112; 264/126; 264/145; 264/171; 264/255

[58] Field of Search ..................... 264/45.8, 46.4, 145, 264/171, 172, 255, 256, DIG. 57, 70, 112, 126

[56] References Cited

U.S. PATENT DOCUMENTS

| | | | |
|---|---|---|---|
| 1,702,730 | 2/1929 | Hite | 264/DIG. 57 |
| 2,518,423 | 8/1950 | Jenett | 264/172 |
| 3,099,518 | 7/1963 | Wetzler . | |
| 3,217,375 | 11/1965 | Kinnard | 264/256 |
| 3,232,017 | 2/1966 | Prusinski et al. | 52/809 |
| 3,295,278 | 1/1967 | Muhm | 264/DIG. 57 |
| 3,305,991 | 2/1967 | Weismann . | |
| 3,328,500 | 6/1967 | Barnette | 264/255 |
| 3,367,818 | 2/1968 | Voelker . | |
| 3,507,738 | 4/1970 | Prusinski et al. | 264/255 |
| 3,512,327 | 5/1970 | La Padura | 52/612 |
| 3,541,639 | 11/1970 | Enicks . | |
| 3,653,170 | 4/1972 | Sheckler | 52/375 |
| 3,892,826 | 7/1975 | Yost | 264/DIG. 57 |
| 3,914,359 | 10/1975 | Bevan | 264/DIG. 57 |

FOREIGN PATENT DOCUMENTS

| | | | |
|---|---|---|---|
| 233560 | 4/1961 | Australia | 264/255 |
| 711888 | 6/1965 | Canada . | |
| 1008976 | 5/1952 | France | 264/255 |
| 1030333 | 5/1966 | United Kingdom | 428/306 |

*Primary Examiner*—James B. Lowe
*Attorney, Agent, or Firm*—Harding, Earley & Follmer

[57] ABSTRACT

A method of forming, in two steps, panel, or shaped article, by first providing a bath of fluent cementitious material under a core of cellular, preexpanded and cohered polystyrene cells or pearls, having a density less than that of the cementitious material, allowing the core partially immersed to rise in a controlled way over the cementitious material, maintaining the core under pressure until the bath has partially set to prevent further rise of the core, pouring onto the core and partially set bath, a second quantity of fluent cementitious material to completely enrobe the core and form thereover a top revetment, smoothing the surface of the second quantity of cementitious material and letting it set to complete the panel.

9 Claims, 10 Drawing Figures

CONTINUOUS PRODUCTION OF BUILDING ELEMENTS HAVING CELLULAR CORES

This is a continuation of Application Ser. No. 12,716, filed Feb. 16, 1979, now abandoned, which is a continuation of Application Ser. No. 575,387, filed May 9, 1975, now abandoned, which is a continuation of Application Ser. No. 278,819, filed Aug. 8, 1972, now abandoned.

BACKGROUND OF THE INVENTION

This invention relates to a method for the manufacture of sheets, panels and shaped articles or parts, of particular utility as a building construction material.

More particularly the invention involves such items, comprising a core of cellular, mineral or organic material having closed cells and provided with facings or revetments over all or part of its surfaces. The facings or revetments may be of mineral or organic materials.

PRIOR ART

In accordance with a known procedure to produce such sheets or panels, a core of resinous thermoplastic expanded pearls autogeneously cohered together, defines interstices between the cells or pearls. The interstices are then filled with a flowable cementitious material which penetrates them. Thereafter the cementitious material is solidified or hardened.

SUMMARY OF THE INVENTION

The procedure of the present method is characterized by a first step of forming below the core layer, a bath of hardenable liquid material to eventually form a revetment adherent to the lower surface of the core. Such liquid material has a density greater than that of the core and thus exerts an upward hydraulic force upon it. The upward displacement effected by such force is controlled and limited as desired so that the core is located at a height or position corresponding to the desired thickness of the lower revetment of the completed sheet or article.

In a second step, after the material of the liquid bath forming the lower facing, has set sufficiently to prevent further buoyant upward displacement, a complementary quantity of the hardenable fluent is flowed onto the top surface of the presently exposed upper portion of the core, to thus complete the enrobement thereof. After setting of the fluent top layer the core is completely covered over both surfaces.

The method has the advantage that the article has a smooth even exterior surface or revetment and which in the case of sheets and panels is of uniform thickness. When the enrobement is carried out to give the core an upper layer, the smoothing and thickness control of such layer is attained by mechanical means.

In accordance with another characteristic and feature of the invention, the revetment material, after the first step, supra, has been carried out, is in a state such that is readily joins with the material emplaced in the second step to thus form a unitary encasement.

The core on which the revetment is formed may be composed of closed cells which are cohered together in a way such that they do not form interstices between them, but in that case the cementitious material is only used as a facing.

According to a characteristic of the invention of particular interest however, the cells forming the core form or define interstices between them and into which the fluent revetment material penetrates to a greater or lesser extent and thus forms with the core, a unitary body which is of relatively light weight per unit of volume, and which has good mechanical strength.

In accordance with a further object and characteristic of the invention, the junction between the two quantities of revetment material deposited during the two respective steps, may as previously explained, lie in or closely adjacent to the median plane of the completed panel. By "median plane" is meant a plane parallel with and essentially mid way between the two surfaces of the completed panel.

The core which is covered by the revetment may advantageously be preexpanded pearls of a thermoplastic resin, heated to softening temperature then slightly compressed to effect autogeneous bonding into a unitary body wherein the pearls form or define interstices or spaces between their points or areas of bonding. Pearls of preexpanded polystyrene may be used as the starting material for the core. Such pearls may be produced in accordance with the method taught in French Pat. No. 1,440,075 and are particularly useful in carrying out the present inventive method. Those pearls are formed by heating granules of polystyrene containing a known expansion or blowing agent, with heated air, followed by treatment with steam.

It is also possible to use expanded pearls obtained by the method taught in French Pat. No. 1,440,076, wherein preexpansion of granules of polystyrene containing a blowing agent, is effected by heating with air at atmospheric pressure, followed by treatment with steam, then further expanded by steam under pressure within an autoclave.

The pearls of polystyrene thus preexpanded are, in accordance with the disclosure, reheated to about 110° C. to their softening point then subjected to light pressure. Such reheating may be effected by hot air, as fully taught in French Pat. No. 1,440,106.

The material forming the revetment or coating is advantageously a cementitious material such as a slurry of plaster formed by slaking lime to produce a pulp of cream-like consistency and thus flowable to enable performance of the method. The fluidity is such, as subsequently described, that in case the core has interstices between the autogeneously cohered pearls the fluent coating penetrates into and fills them.

Other objects and advantages of the invention will become clear to those skilled in the art, after a study of the following detailed description in connection with the accompanying drawings wherein is depicted apparatus for performing the method. However, the disclosure is to be taken in an illustrative rather than a limiting sense because numerous variations and modifications will become obvious after knowledge of the basic invention.

DESCRIPTION OF THE PREFERRED EMBODIMENT

Figure 1:
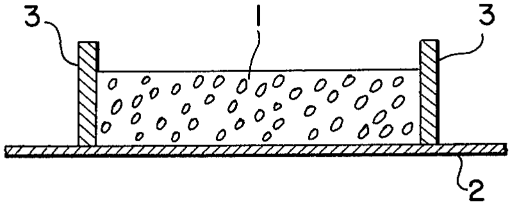
FIGS. 1 to 5 are vertical sections showing schematically sequential steps in performance of the method and in accordance with a first embodiment thereof.

Referring to FIG. 1, an elongated ribbon-like core 1 formed in manner previously explained, is deposited upon a belt or conveyor 2 moving in a plane normal to the plane of the figure, between side walls or belts 3, and which may be moving in the same direction and at essentially the same speed as supporting belt or conveyor 2. Belts 3 may be of rubberized fabric and thus flexible.

Figure 2:
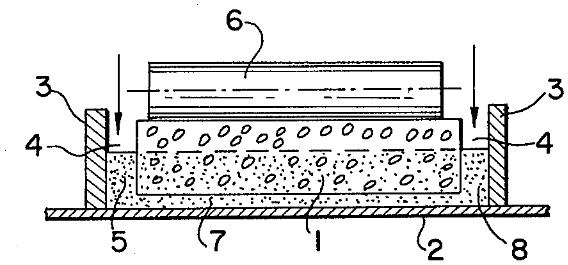

At the location along the travel of the belts indicated in FIG. 2, the side belts 3 are guided laterally apart to separate a predetermined distance from core 1 and thus define spaces 4 with the side walls thereof. Then, also as shown upon this Figure, liquid plaster forming bath 5 is poured into the channel conjointly defined, right and left, between the core and the side belts 3. Core 1, having a density less than that of the fluent plaster forming the bath, rises above belt 2 to a height thereabove determined by a roller 6 superposed over and in contact with the core and rotating about a horizontal axis normal to the direction of travel of the belts. Since the roller is adjustable to vary the distance of its axis above belt 2, the thickness of lower facing or revetment 7 can be adjusted to a desired value. Likewise, since the distance between belts 3 and the respective side walls of core 1 can be adjusted, the lateral thickness of the plaster side coverings is also adjustable and predeterminable. When the core is composed of cells which, though bonded together over limited areas of each cell, nevertheless form open spaces or channels between them, the bath penetrates into and fills those spaces.

As shown upon FIG. 2 the first step just described may effect the emplacement of the core within the bath, up to the level of the median or neutral plane of the core.

Figure 3:
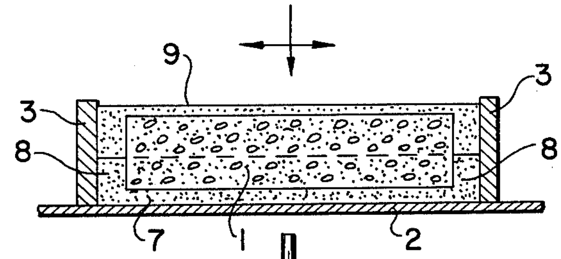

After the material constituting the bath has set sufficiently so that it no longer can displace the core upwardly, a second portion of the fluid cementitious material is poured on as shown upon FIG. 3, to thus complete the enrobement of the core and form a second layer or revetment 9 thereover. In this step the cementitous material is deposited directly onto the core. If as previously noted, the core comprises cells defining spaces between them, the cementitious material added in the second step fills them and thus permeates throughout the entire core, within those spaces or interstices.

Figure 4:
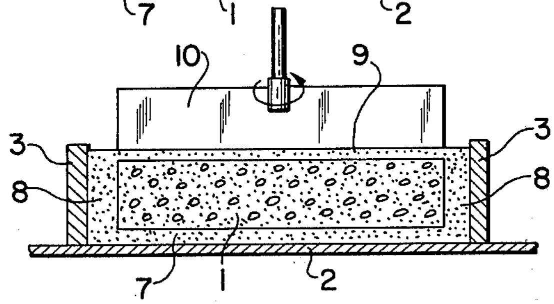
Figure 5:
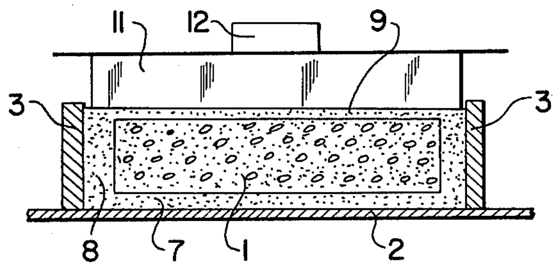

The second facing, layer or revetment 9 is smoothed and leveled in the way shown at FIG. 4, by a doctor blade 10 having its lower edge parallel with belt 2 and at the desired elevation above the core. The blade rotates about its central vertical axis, as indicated by the arrow.

Alternatively or in addition to the smoothing procedure depicted upon FIG. 4, a finished surface may be formed by a screed 11 having its lower surface or edge at the desired and adjustable elevation above the core, and associated with a vibrator 12 to thereby compact and eliminate voids in the surface.

Figure 6:
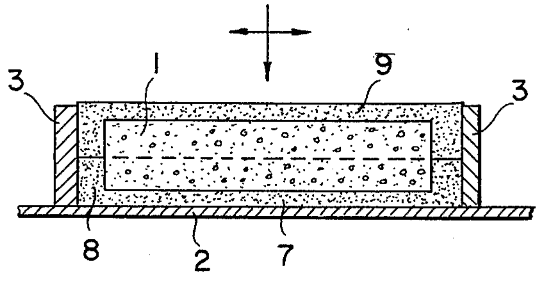
FIGS. 6, 7 and 8 are views similar to FIGS. 3, 4 and 5, showing a modified way for carrying out the second step.
Figure 7:
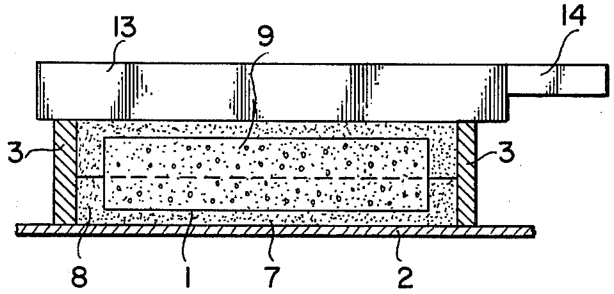
Figure 8:
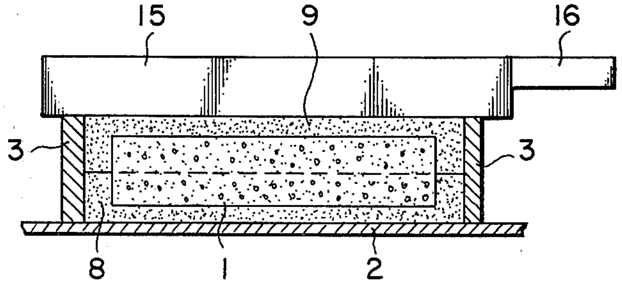

In another and alternative procedure for the second step, as depicted upon FIGS. 6, 7 and 8, the channel formed by and between belts 2 and 3, is filled as in FIG. 6 to a level a little above the top edges of belts 3. Then at least some of the excess cementitious material is scraped and leveled off by a doctor blade or screed 13 having a vibrator 14 associated therewith, as in FIG. 7, followed by one or more blades 15, FIG. 8, under the influence of vibrators 16, which bring the level of the cementitious material coplanar with the top edges of the bands or belts 3 and thus form a top layer or revetment 9. The blades 15, while horizontal, have their longitudinal axes inclined to the direction of longitudinal travel of the enrobed core, which direction as will be understood, is normal to the planes of the figures.

Figure 9:
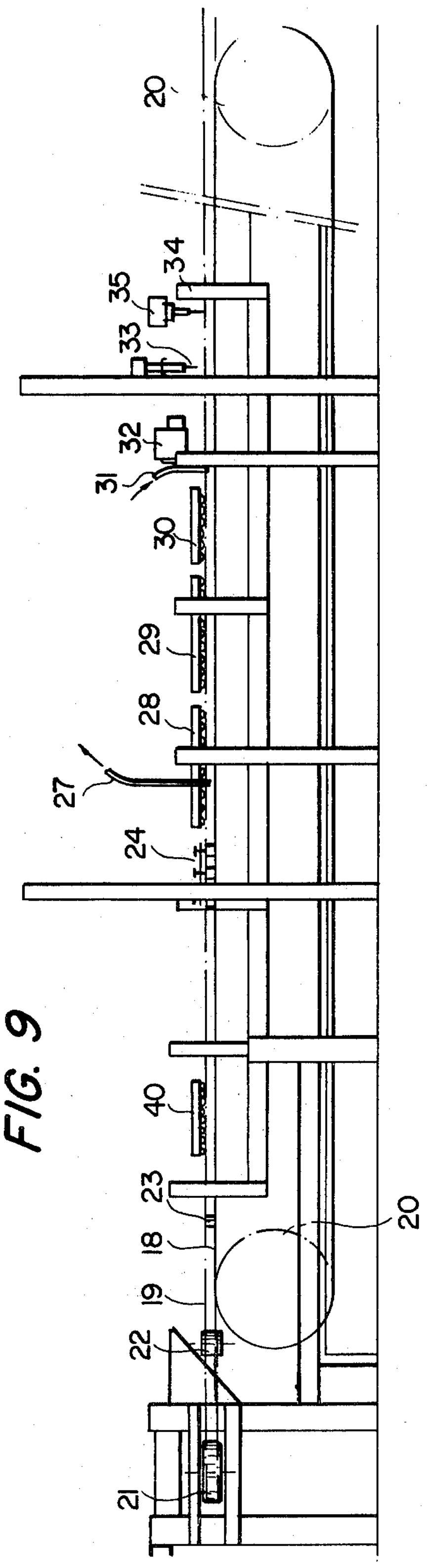
FIG. 9 is a side elevation of mechanism for performing the method in a continuous production line procedure.
Figure 10:
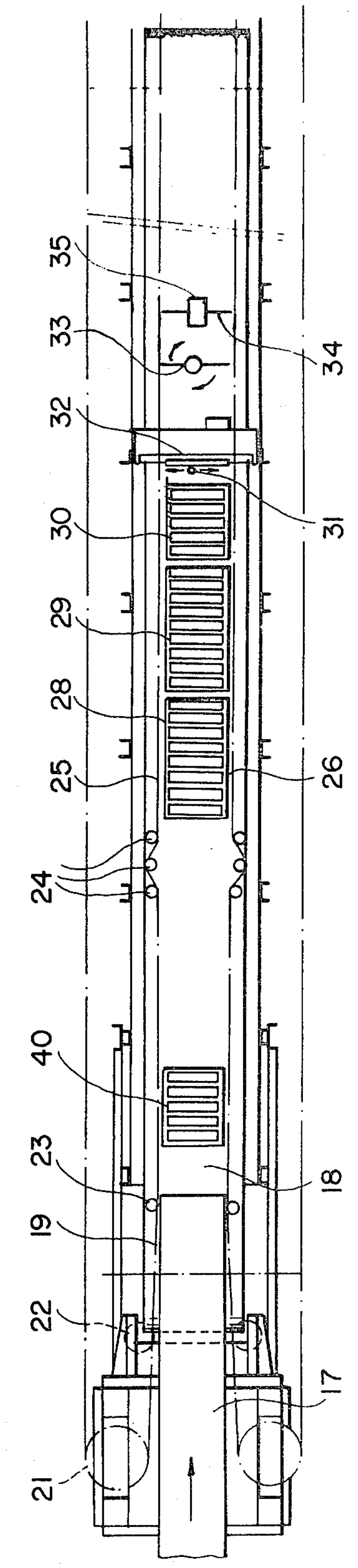
FIG. 10 is a plan of FIG. 9.

FIGS. 9 and 10 show schematically an apparatus for performing the method in a continuous production-line procedure. A ribbon 17, FIG. 10, of expanded cohered pearls of polystyrene, prepared in the way previously described, is advanced left to right as indicated by the arrow, and passes onto the upper run of a driven horizontal conveyor belt 18 guided about end pulleys 20. Two side belts corresponding to items 3, FIGS. 1 to 8, and identified at 19, are provided. Confining attention to the belt 19 at the top of FIG. 10, this belt passes about end pulleys 21 having vertical axes of rotation, and travels in horizontal runs at approximately the same speed as main or support belt 18. The operating part of those runs, as shown at FIG. 10, moving left to right, first passes about rollers 22 and 23 having vertical rotation axes, to be guided thereby over belt 18 and with its lower edge in substantial contact therewith but spaced inwardly from its adjacent side edge.

At 24, FIGS. 9 and 10, are shown a series of pulleys or rollers with vertical axes, which act to guide the operating run of belt 19, laterally outwardly to about registration or coincidence with the adjacent side edge of belt 18, thus forming with that belt, a receptacle or channel to receive the fluent cementitious material. The core or ribbon 17 is held down by rollers 40, to thus assure at this time that its lower surface is in contact with belt 18.

It will be understood that the horizontally-moving side belt 19 at the lower side of FIG. 10 is guided over and along belt 18 in a similar way as just described, so that the path of its operating run, moving left to right, is a mirror image of the one just described.

At the location where the operating runs of the two belts 19 move apart in traversing the sets of idler pulleys 24, the cementitious material is deposited into its channel at and along the side edges thereof, that is, into the space between the side walls of the core and the adjacent operating runs of belts 19, as indicated at 25, 26, FIG. 10. Emplacement of cementitious material is through a number of conduits 27, FIG. 9.

As the bath of cementitious material is thus deposited and flows beneath the core, the buoyant force tends to move it upwardly so that as the movement of the belts proceeds the cementitious material forms a lower layer, like that indicated at 7, FIGS. 2 to 6. The thickness of the layer is controlled by a series of top rollers 28, 29, 30 having horizontal axes disposed transversely of the direction of travel of the belts. These contact the top surface of the core and are vertically adjustable to control and regulate the thickness of the lower revetment such as 7.

As the assembly, now in the form depicted on FIG. 2, arrives beneath a conduit 31, FIGS. 9 and 10, the cementitious material previously added through conduit 27 has set sufficiently to prevent further rise of the core relatively thereto. The second step is then initiated by depositing onto the core, through conduit 31, a further supply of cementitious material. The material thus freshly added is spread by a blade 32 which is oscillated back and forth transversely of the belts and with its lower straight horizontal edge in contact with the cementitious material.

Following this, the assembly passes beneath a doctor or screed plate 33 which rotates as indicated in FIG. 10, about a vertical axis centrally of the belt 18 and with its lower straight edge in contact with, and smoothing the surface of the top layer or revetment. Next, the assembly passes beneath a fixed blade 34 connected with a vibrator 35 so that its straight transverse lower edge improves the smoothness of the treated surface.

The finished product then continues on conveyor 18 to the right, FIGS. 9 and 10, and after essential hardening of the material, may be cut into selected lengths.

EXAMPLE

A ribbon of polystyrene pearls formed in the way previously explained herein, has an apparent density of about 7 kg/m3 and a porosity of 0.4. The ribbon is enrobed in a plaster of Paris mixed in the proportion water/pulverulent plaster=1/1. The water to dry plaster ratio is not highly critical but depends mainly upon the quality of the plaster used, other conditions being the same. The minimum fluidity of the mix, which will effect the total impregnation with plaster of the interstices between the cohered polystyrene cells of the core is of the order of 220 mm determined in accordance with the FLS ring test. That test consists in disposing on a plane supporting surface, a hollow cylinder of 60 mm internal diameter and 49 mm height. The cylinder is filled level with the aqueous plaster mix to be tested and the cylinder is lifted to free the volume of plaster mix it contained. The plaster spreads out upon its supporting surface, and forms a disc having a final diameter which is a function of the initial fluidity of the mix. This explains the 220 mm diameter previously mentioned as a satisfactory value.

The second deposit of plaster is made with material of the same quality as the first mixed in the same proportion of water to pulverulent plaster, when the fluidity of the previously deposited mix has decreased to between about 140 and 60 mm, based upon the aforesaid FLS test, as the buoyant force thereby exerted is then exceeded by cohesion between the core and the plaster, and is therefore at that time incapable of effecting further upward displacement of the core.

The facings of the impregnated ribbon, sheet or panel of polystyrene had the following dimensions:

Two controlled surface revetments, upper and lower, of about 10 mm thickness each;

Two side wall revetments also controlled and of about 15 mm thickness in horizontal dimension transversely of the direction of travel during formation.

After the plaster has set, the side edges are smoothed or trimmed and the ribbon is cut into desired lengths or sizes and is allowed to dry either in ambient air or in an oven. The completed panel has a length as determined by its ultimate use, an over all width of 0.60 m and an over all thickness of 70 mm.

The completed product is 40% lighter than a panel of the same dimensions but made solely of plaster; moreover 40% less energy is required for drying it. The decrease is independent of the quality of the plaster used, and is due to the replacement of plaster by an equivalent volume of polystyrene core.

Elements produced in accordance with the invention had an index of rupture by flexion, of 5.5 kg of cm of width. This value of rupture by flexion is obtained using a plaster of Paris as defined by the French standard NFP 12 301, mixed with water, the pulverulent plaster to water ratio being chosen as previously stated. The value may vary in accordance with the quality of the plaster and the water to pulverulent plaster ratio.

Fire and flame resistance tests according to CSTB test method (technical Appendix No. 2 of Departmental Order dated Aug. 28, 1959 of the Ministry of Public Works and Transportation, France) gave a 2 hour fire stop rating and a 2 hour flame shield rating.

Material constructed in accordance with the invention has a thermal conductivity of about $80\times10^{-3}$ kcal/hr/m/° C.

Sheets constructed in accordance with the invention may be mounted in the same way as prior art partitions, cut to standard "floor to ceiling" lengths, used in a form having fitted joints laterally and sealed along upper and lower edges. The material may be in the form of small units or pieces, say, three to four per square meter, with interfitting edges and sealed joints. The finished material is readily cut to desired sizes and shapes.

Among numerous other materials suitable for carrying the invention into practice may be mentioned cement and phenolic and polyurethane foams. As further uses may be mentioned breast walls in conjunction with window installations. Ceiling tile for residential constructions, and made in accordance with the novel method, are likewise contemplated. Numerous other uses will readily occur to those skilled in the art after a study of the foregoing disclosure.

I claim:

1. A continuous method of forming building elements and the like which comprises partially filling a moving continuous mold with a hydro setting sludge, maintaining in the sludge a continuous cellular ribbon having a density less than that of the hydro setting sludge, floating the ribbon upwardly to a desired position by the buoyant force of said sludge, covering the ribbon with more sludge, letting the upper and lower layers of sludge set, and cutting the hardened coated object into sections.

2. A method according to claim 1 which comprises assisting the levelling and shaping of the upper surface of the hydrosetting sludge by vibrations.

3. A method according to claim 1 in which the width of the fluid sludge which receives the cellular ribbon is greater than the width of the ribbon.

4. A method according to claim 1 in which the cellular ribbon is composed of cells, conjoined at their points of contact, between the cells of which pores extend into said ribbon.

5. A method according to claim 1 in which a major part of the cells of the ribbon are expanded polystyrene.

6. A continuous method of forming revetted materials having a core of conjoined organic pearls and a circumscribing coating of set, inorganic hydraulic cementitious material which comprises continuously pouring a moving bed of a fluid inorganic hydraulic cementitious material, partly immersing a preformed porous elongated platelike body of conjoined organic pearls for part of its thickness in said fluid cementitious material, moving said platelike body with said fluid material, said fluid cementitious material having a density greater than that of the body of conjoined organic pearls so that it exerts a buoyant force against said body, moving said platelike body upwardly in a controlled way by exerting the buoyant force of said fluid material against said body, applying a holddown force to said platelike body to hold it partly immersed in said fluid cementitious material against the buoyant force of said fluid material, said conjoined pearls having interstices therebetween, filling the interstices near the surface of said platelike body with said fluid material, allowing said fluid material to set partly to overcome said buoyant force to hold the platelike body partly immersed, releasing said holddown force from the platelike body, applying an upper coat of said fluid material to the partly set fluid material and to the platelike body before the partly set fluid has hardened, filling the upper surface interstices of said platelike body with said fluid, and allowing said fluid cementitious material to set and harden about the platelike body.

7. A continuous method of making building elements and the like having a cellular core conjoined with a facing which comprises laying a platelike core onto a moving conveyor, pouring a hardenable liquid onto the conveyor to form a continuous lower bath of hardenable liquid material below said core to eventually form a lower facing adherent to the lower surface of the core after said core has been moved upwardly by said liquid material, moving the core upwardly by exerting an upward hydraulic force by said liquid on the core because said liquid has a density greater than that of the core, applying a controlling force to the core to control the upward displacement caused by said hydraulic force as desired to locate the core at a height corresponding to the desired thickness of the lower facing of the completed building element, allowing said liquid to set sufficiently to prevent further buoyant upward displacement of the core, removing said controlling force from the core, applying a continuous upper bath of hardenable liquid to the exposed upper surfaces of the core and to the partly set liquid to complete the enrobement thereof, and letting said upper and lower liquid bath set to completely cover the core.

8. The method of claim 7, including the steps of forming said core comprising taking pre-expanded pearls of thermoplastic resin, heating said pearls to softening temperature, and compressing said pearls to effect autogeneous bonding into a unitary body wherein the pearls form interstices between their areas of bonding.

9. A continuous method of making building elements and the like having a cellular core conjoined with a facing which comprises depositing an elongated platelike ribbon-like core upon a moving conveyor betwen two moving side belts that move with the conveyor, moving the core with the conveyor, providing a space between the sides of the core and each of the belts by spreading the belts apart a predetermined distance from the core, pouring a first portion of liquid plaster forming bath into the spaces between the core and the side belts to form a lower facing, said core having a density less than that of said liquid plaster, moving the core upwardly in the bath by the buoyant hydraulic force of the liquid plaster, stopping the upward movement of the core at a predetermined height to adjust the thickness of the lower facing to a desired value, holding said core in place by allowing said liquid plaster of the lower facing to set sufficiently so that it no longer can displace the core upwardly, pouring a second portion of the liquid plaster forming bath onto the core to complete the enrobement of the core and form an upper facing, and smoothing and levelling the upper facing.

* * * * *